United States Patent

Depinet et al.

[11] Patent Number: 6,155,775
[45] Date of Patent: Dec. 5, 2000

[54] DESTACKING FEEDER

[75] Inventors: Paul E. Depinet, Tiffin; Carolyn S. Lambert, Monroeville; Donald E. Detterman, Willard, all of Ohio

[73] Assignee: R. R. Donnelley & Sons Company, Chicago, Ill.

[21] Appl. No.: 09/326,907

[22] Filed: Jun. 7, 1999

Related U.S. Application Data

[60] Provisional application No. 60/088,615, Jun. 9, 1998.

[51] Int. Cl.⁷ .................................................. B65G 59/02
[52] U.S. Cl. ..................................... 414/796.4; 414/796.3; 414/796.8; 198/395; 198/399; 198/463.6
[58] Field of Search ....................................... 198/399, 395, 198/463.6, 468.8, 377.01; 414/795.7, 796.4, 796.8, 797.2, 796, 796.3

[56] References Cited

U.S. PATENT DOCUMENTS

| | | |
|---|---|---|
| 1,969,994 | 8/1934 | Stevenson . |
| 2,944,702 | 7/1960 | Fenton .............................. 414/796.3 X |
| 2,975,911 | 3/1961 | Wedensky ......................... 414/796.4 X |
| 3,342,349 | 9/1967 | Sheldon et al. ................... 414/796.4 X |
| 3,534,872 | 10/1970 | Rith et al. ........................ 414/796.4 X |
| 3,870,167 | 3/1975 | Werner . |
| 3,939,993 | 2/1976 | Lingl, Jr. .......................... 414/796.3 X |
| 3,991,888 | 11/1976 | Beckius et al. . |
| 4,437,560 | 3/1984 | Wolf ................................. 198/370.1 X |
| 4,569,620 | 2/1986 | Lynch ............................... 414/795.3 X |
| 4,784,493 | 11/1988 | TUrcheck, Jr. et al. ............. 198/399 X |
| 4,807,739 | 2/1989 | Wolf et al. ............................... 198/415 |
| 4,819,784 | 4/1989 | Sticht . |
| 4,907,686 | 3/1990 | Cotic ................................... 198/399 X |
| 4,955,784 | 9/1990 | Staszewski et al. ................. 414/796.4 |
| 5,009,305 | 4/1991 | Auld et al. .......................... 198/399 X |
| 5,427,252 | 6/1995 | Teegarden et al. .............. 414/796.4 X |
| 5,450,940 | 9/1995 | Rathert et al. .......................... 198/412 |
| 5,713,453 | 2/1998 | Schrnhorst et al. ............. 414/788.3 X |
| 5,820,335 | 10/1998 | Croteau et al. ...................... 414/788.3 |

FOREIGN PATENT DOCUMENTS

| | | | |
|---|---|---|---|
| 4-159915 | 9/1980 | Japan ..................................... 198/399 |
| 2040852 | 9/1980 | United Kingdom ................... 198/399 |

OTHER PUBLICATIONS

"Component orienting apparatus", by B. Dechyshyn, IBM Technical Disclosure Bulletin, pp. 194 and 195, vol. 15, No. 1, Jun. 1972.

*Primary Examiner*—Robert P. Olszewski
*Assistant Examiner*—Thuy V. Tran
*Attorney, Agent, or Firm*—Fitch, Even, tabin & Flannery

[57] ABSTRACT

An apparatus and method feeding, destacking and orienting books for subsequent operation such as a jacket wrapping operation. This is achieved by feeding stacks of books forwardly on a conveyor into a destacking station. The books are stripped one at a time from a stack at a stacking station and fed forwardly. A sensor senses the orientation of the book and controls a selectively turning, usually of alternating books, to have all the book backbones facing in the same direction while they are traveling forwardly.

9 Claims, 5 Drawing Sheets

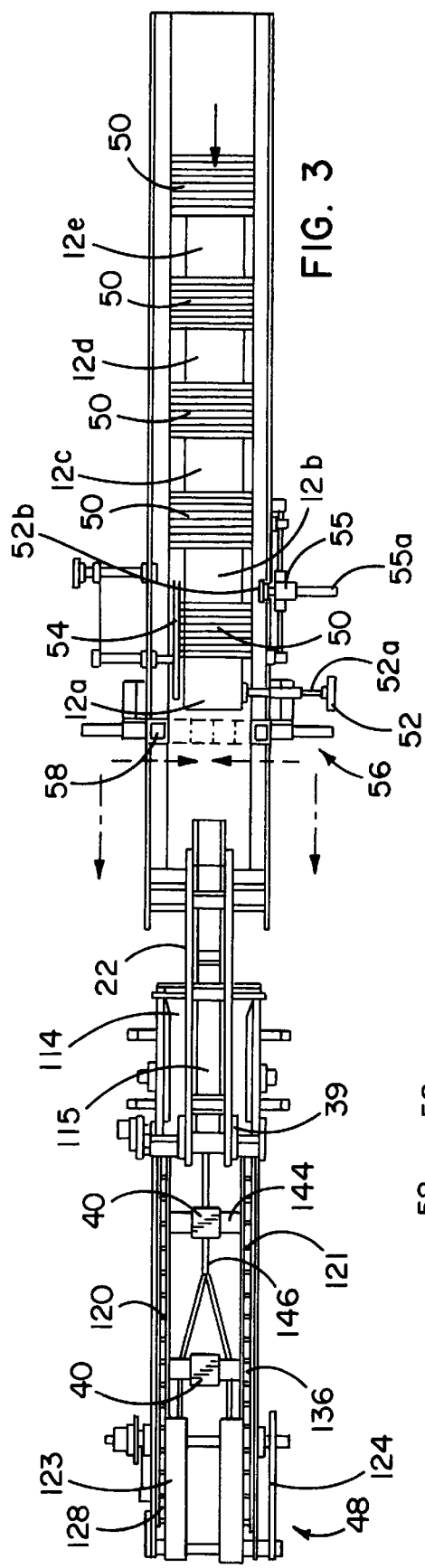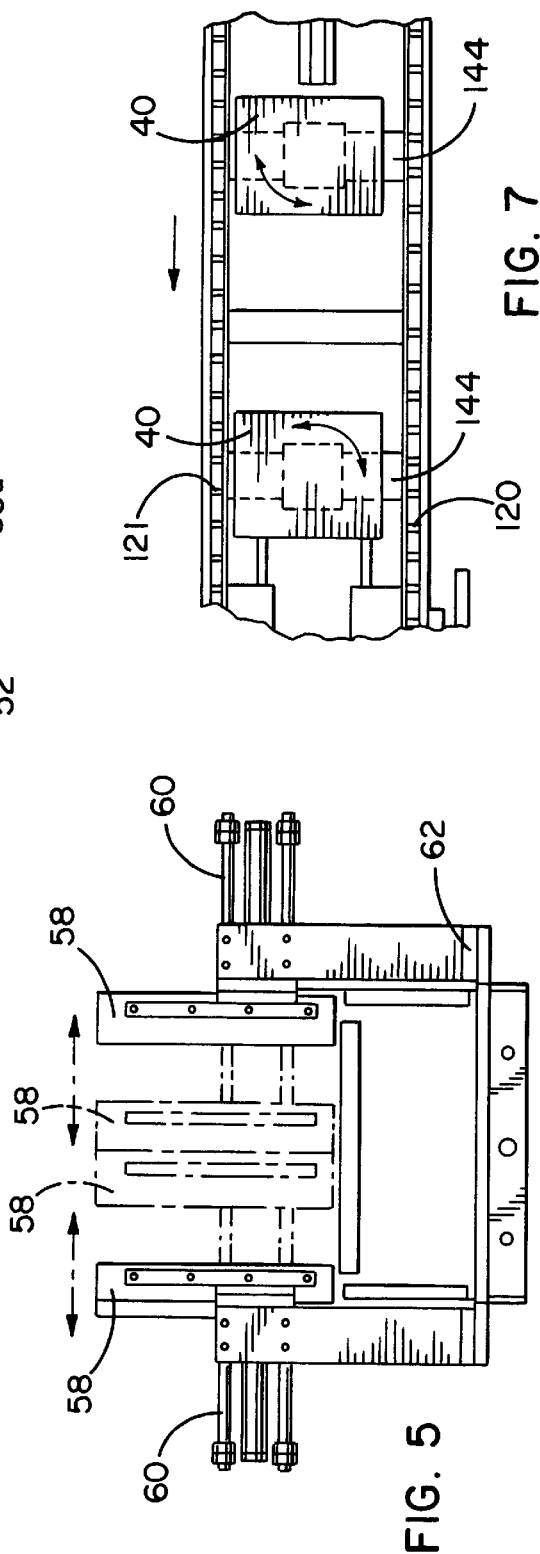

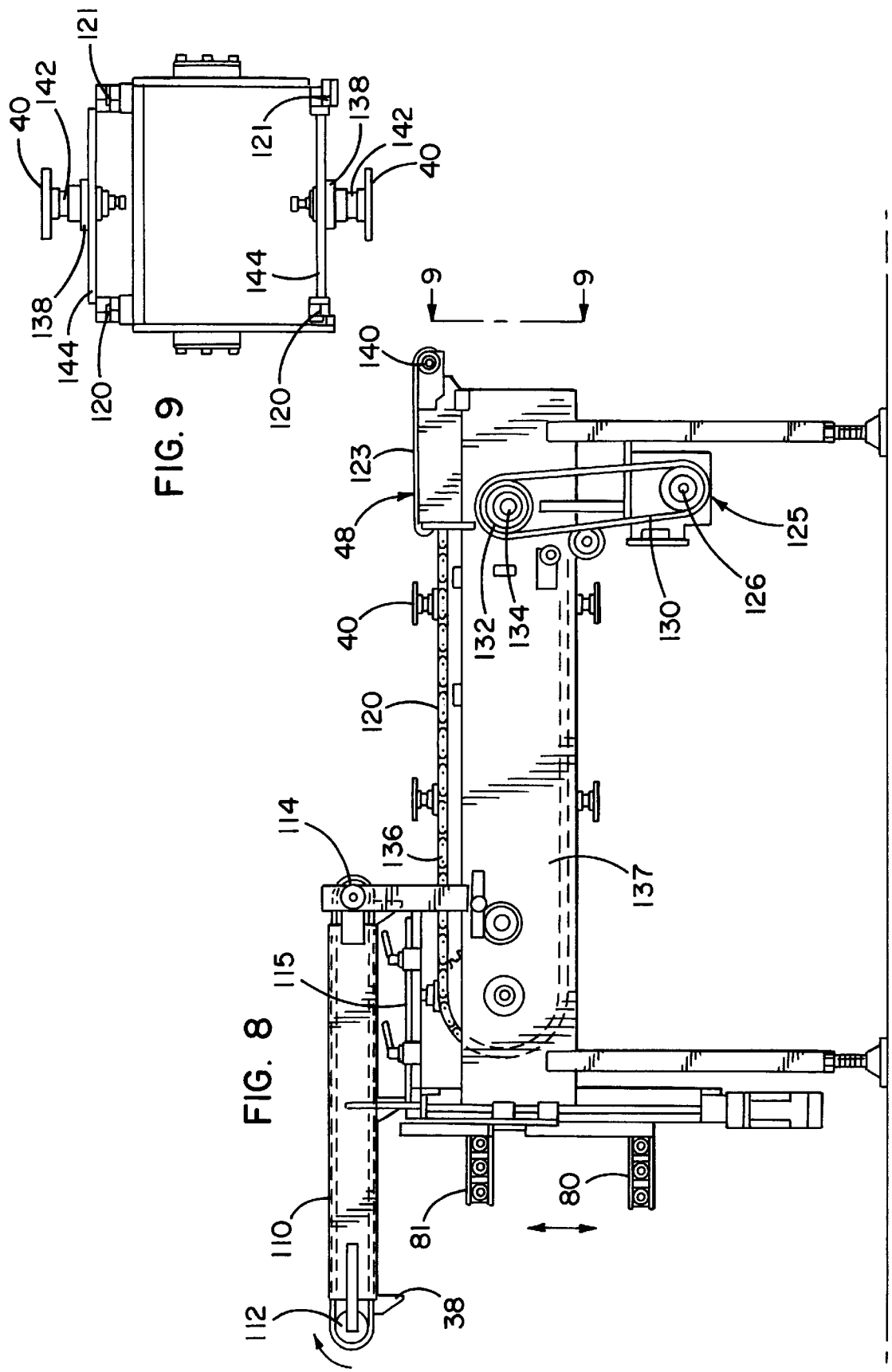

DESTACKING FEEDER

This application claims benefit of Provisional Application No. 60/088,615, filed Jun. 9, 1998.

FIELD OF THE INVENTION

This invention relates to a method of and an apparatus for destacking books and orienting and feeding the oriented books for subsequent operations.

BACKGROUND OF THE INVENTION

Books such as hard cover books are often delivered on large pallets in stacks with the books being counterstacked within a stack. That is, adjacent books in the stack have their backbones pointed in opposite directions. If the books are to be operated in a subsequent operation, for example, being jacket wrapped with a wrapper or container by automatic equipment, it is often necessary to destack the books and feed them forwardly in a continuous stream at a required rate to keep the subsequent operation running at the desired speed. For the jacket wrapping equipment, the destacked books also must be oriented so that all of the books face in the same direction.

Heretofore, much of the destacking and book orienting has been done manually. In the manual operation, book stacks would be placed on a lift table and one or two persons would lift the top book of the stack and place it on the infeed conveyor to the jacket wrapping machine. Because the books were counterstacked, the person would manually turn every other book so that all of the books were facing in the same direction as they went into the jacket wrapper. The manual operations are slow, e.g., about 40 books per minute, when compared to higher, automated book feed rates such as 40 to 75 books per minute. In addition to being slower, the manually repetitive operations of lifting and turning the books are desired to be eliminated and replaced with a more ergonomically desired, automated process. From a cost standpoint, it is desirable to replace the two people feeding and turning the books with a faster, automated system. It is important when handling the books, whether in a stack or when destacked, that the equipment handle the books carefully and not bang one book against another book and cause damage to one or more of the books. Thus, there is a need for a new and improved method and apparatus for destacking, orienting and feeding books at high speeds with reliable equipment.

SUMMARY OF THE INVENTION

In accordance with the present invention, there is provided a new and improved method of feeding, destacking and orienting books for a subsequent operation such as a jacket wrapping operation. This is achieved by feeding stacks of books forwardly on a conveyor into a destacking station. The books are stripped one at a time from a stack at the stacking station and fed forwardly. A sensor senses the orientation of the book and controls a selective turning, usually of alternating books, to have all the book backbones facing in the same direction while they are traveling forwardly.

In the illustrated embodiment of the invention, the books are stripped from stacks that are continuously traveling upwardly to spaced pushers or strippers that push and strip the top book of the stack from the stack, i.e., the top book is stripped from the top of the stack and pushed onto a conveyor that conveys the book to the orienting station. The preferred sensing device for sensing the orientation of the book is an electric eye that senses the front or the backbone of the book as the book is carried past the electric eye. The preferred orienting device comprises rotatable plates or pallets on a continuously traveling conveyor. Each plate is selectively controlled to turn or orient the book in accordance with the sensed condition for the book being carried by the plate. Thus, the books can be destacked, oriented and delivered at speeds up to 75 books per minute while eliminating the slower speed manual system.

BRIEF DESCRIPTION OF THE DRAWINGS

FIG. 3 is a planned elevational view of the apparatus shown in FIG. 2;

FIG. 5 is an end elevational view of gate-pusher elements for book stacks on a stream conveyor;

FIG. 7 is a fragmentary, enlarged plan view showing the rotatable plates used to reorient the books at the reorienting station;

FIG. 8 is an elevational view showing the reorienting conveyor, an overhead stripper for stripping books, and the reorienting conveyor;

FIG. 9 is an end elevational view of the reorienting conveyor; and

DETAILED DESCRIPTION

Figure 1:
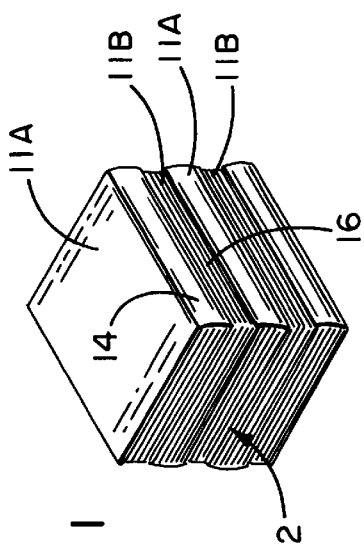
FIG. 1 illustrates a book stack having books with backbones of adjacent books facing in opposite directions.

As shown in the drawings, for purposes of illustration, the invention is embodied in an apparatus 10 (FIG. 2) for destacking books 11 from a stack of books 12 shown in FIG. 1 in which alternating books 11a and 11b have their spines or backbones 14 and front portions 16 facing in alternating directions within the stack. In accordance with the preferred method of the invention, the books in the stack 12 are automatically fed forwardly from an accumulating or stream conveyor 20 to a stripper station 22 wherein a book is stripped from one end of the stack and is fed forwardly, one at a time and at spaced intervals, to an orienting device 24 at an orientating station 26. A sensing device 28 senses the book backbone or front and causes the orienting device to turn selected books so that all of the books are facing in the same direction.

Referring now in greater detail to the preferred method of destacking, orienting and feeding of books, the book stacks 12 are fed as a stream by the stream conveyor 20 into a lifting station 32 where the book stacks 12 are lifted upwardly as by elevators 34 or the like to an overhead traveling stripper device 36 which strips the books from the top of the stack such as by pusher or stripper elements 38 on the overhead traveling stripper device. Also in the preferred embodiment of the invention the sensing device 28 is provided with an electric eye 39 which senses the orientation of the book being placed on a rotating plate or platen 40 at the orienting station 26. Herein, books are carried forwardly and they are simultaneously turned and oriented on an endless orienting conveyor 42 to a discharge station 46 at which is located a discharge device 47 such as a discharge conveyor 48 which conveys the destacked and oriented books to a device (not shown) for subsequent operation, such as a jacket wrapping machine for wrapping the book inside a jacket.

Figure 2:
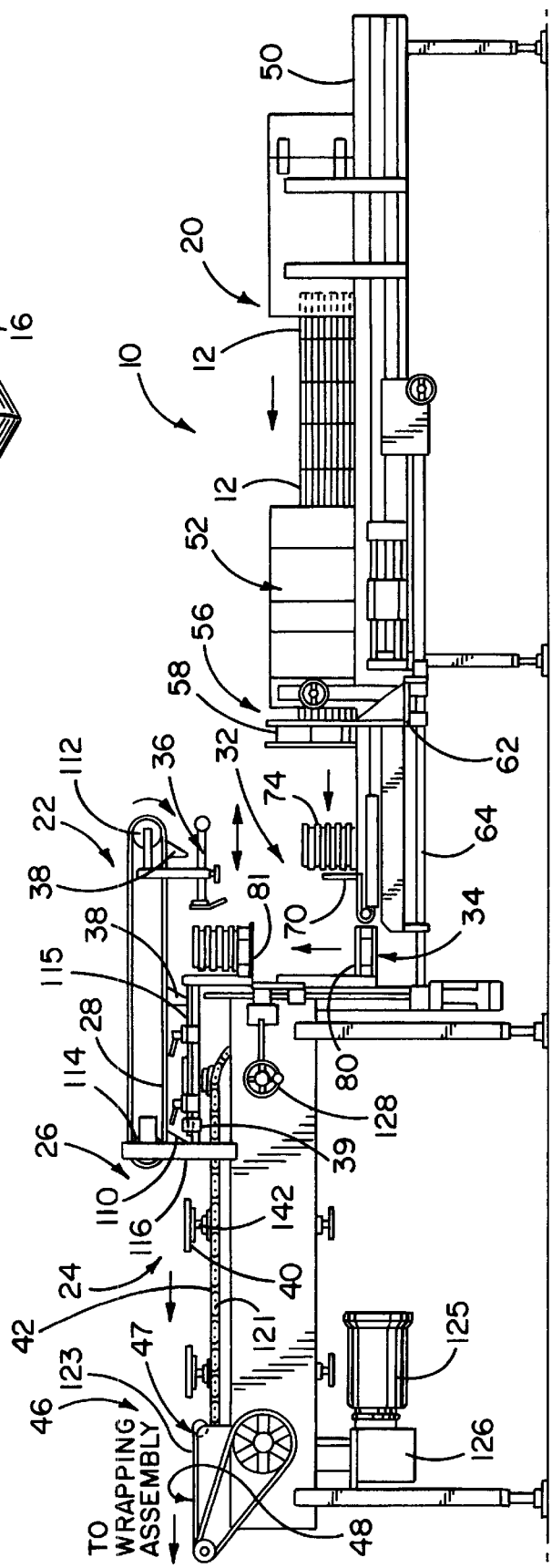
FIG. 2 is a view of a preferred apparatus for practicing the method of the invention of destacking, orienting and feeding oriented books.

Referring now in greater detail to the description of illustrated apparatus used to practice the method of the invention, the incoming stream feed conveyor 20 is provided with a conveyor mechanism or supporting and rotating rollers 50 located beneath the book stacks 12. As best seen in FIG. 2, an operator has loaded a number of book stacks on the underlying rotating rollers which carry each stack forwardly until it reaches side clamp devices 52 which move laterally to engage the sides of the book stacks to hold the same against forward travel by the underlying rotating rollers until released. The side clamps 52 are located adjacent a gate-pusher station 56, as best seen in FIGS. 3 and 5. Under the time controlled sequence of the computer (not shown), the gate-pusher elements 58 on opposite sides of the conveyor 20 are shifted from an open or gate position, which is shown in solid lines in FIG. 5 and in FIG. 3, which allow a stack to pass between the respective opposed gate-pusher elements 58 to a closed, pusher position, which is shown in dotted lines in FIGS. 3 and 5 at locations behind a loading book stack on the stream conveyor.

The leading book stack 12a (FIG. 3) is held by a side clamp device 52 until its fluid cylinder, linear actuator 52a is actuated to retract from engaging the sides of the leading book stack which allows the leading book stack only to travel forwardly. The linear actuator 52a, when being actuated to a clamping position, moves laterally across the conveyor to forcibly press the book stack against a jogger plate 54 which engages the opposite sides of the bock stack 12a. The leading book stack 12a is separated from the next following book stack 12b to facilitate loading of the leading book stack onto lifting plates. The second book stack 12b is clamped by second side clamp device 55 having its own fluid cylinder actuator 55a to push its clamping pad 52b against the sides of the book stack and to clamp the book stack 12b against the jog plate 54. Thus, the side clamp device 55 holds the second leading stack from traveling forwardly to abut the first leading stack 12a when the latter stops its forward motion. This prevents the books in stacks from banging against each other. The leading book stack 12a travels forward on the rollers to abut a selectively, raisable stop 70 that is raised to engage the bottom book of the leading stack and to stop its travel and to hold the leading stack adjacent the discharge end of the stream conveyor 20.

When an elevator 34 is positioned to receive the leading stack, the pusher elements are shifted from their solid line gate position of FIG. 5 to their closed pusher position shown in dotted lines in FIG. 5. The pusher elements then slide forwardly along the conveyor to abut the trailing side of the leading book stack at the raised stop 70, which is then lowered, and the pusher elements 58 push the stack onto an elevator plate 81 which is positioned to receive the lower surface of the lower book on the leading stack 12a. To transfer the book stack 12a to the elevator plate 81, the pusher elements 58 are mounted on slidable carriages 62 (FIG. 4) which have a pair of bearing mounts 64 slidable along horizontal slide rods 66 under operation of a double acting, fluid cylinder 68 which reciprocates the slidable carriage along the slide rods. A controller (not shown) times the operation of the upper fluid cylinders 60 to move the pusher elements to their open, gate position and to their closed pushing position and likewise the operation of the lower fluid cylinders 70 to cause forward and aft travel of the carriage 62 and the pusher elements 58 thereon.

Figure 6:
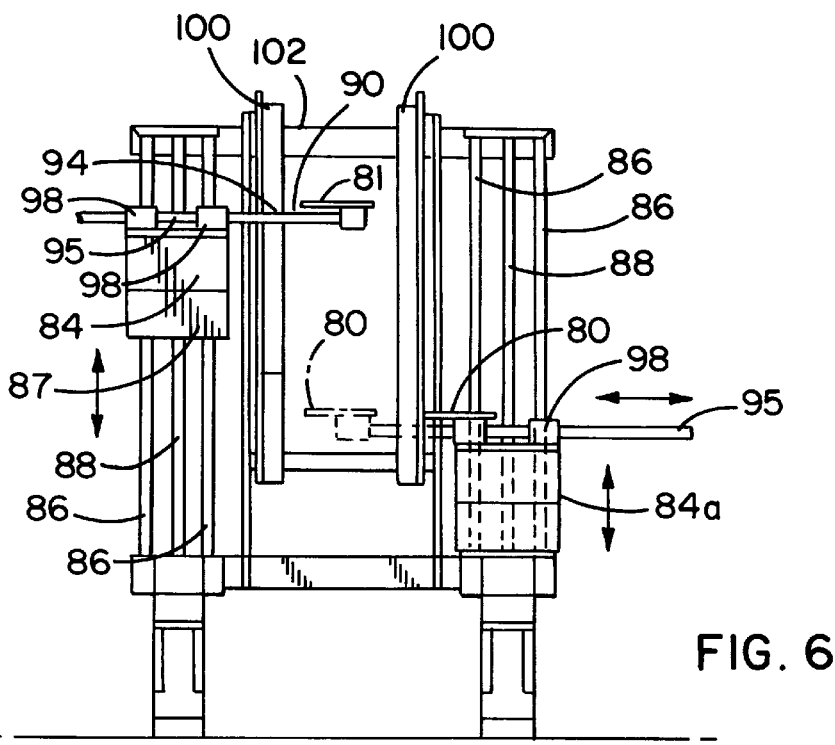
FIG. 6 is an end elevational view of a pair of elevators for lifting books at the elevator station.

In accordance with the preferred embodiment of the invention, the book stacks 12 are lifted substantially continuously in an upward flow or travel by a pair of alternating conveyor or lifting plates 80 and 81. As best seen in FIG. 6, the preferred lifting elevators comprise a carriage 84, as best seen in FIG. 6, which slides on a pair of vertical slide rods 86 for vertical movement while a motor drive unit 87 has a nut to mesh with and travel along a vertical ball screw 88 to drive the lift plate 81 and carriage 84 upwardly at a controlled and variable speed rate to match the speed of the stripping conveyor and the speed of the orienting conveyor.

The illustrated lifting plates 80 and 81 are shifted horizontally between the effective lifting position, as shown by the upper plate 81 in solid lines in FIG. 6 and a retracted position shown for the lower lifting plate 80 in FIG. 6. To this end, the lifting plates are mounted on elongated horizontal slide rods 94; and the lifting plates are movable horizontally by double acting cylinders 95 to slide within a pair of slide blocks 98 between the retracted and lifting positions. Each lifting plate 80 or 81 is shifted to the retracted position for travel downwardly. After having reached the bottom of is travel, the lifting plate 80 or 81 is then shifted by operation of its fluid cylinder 95 to the extended operative position for a subsequent traveling upwardly and carrying of books upwardly. This provides a substantially continuous stream of books to the stripper device 23 at a high rate of speed.

Usually the uppermost book 11 of the lower stack 12 on the lower lifting plate 80 or 81 is positioned one space below the stack of books on the upper plate. Thus, when the last book of the upper stack is stripped from the upper lifting plate, the top book in the next stack is engaged not by the first but by a succeeding stripper element 38. Preferably, during the upward traveling, the stacks 12 of books 11 are guided between a pair of stationary, angled book stack guides 100 which extend vertically and are fixed to stationary cross, frame numbers 102, as best seen in FIG. 6.

Figure 4:
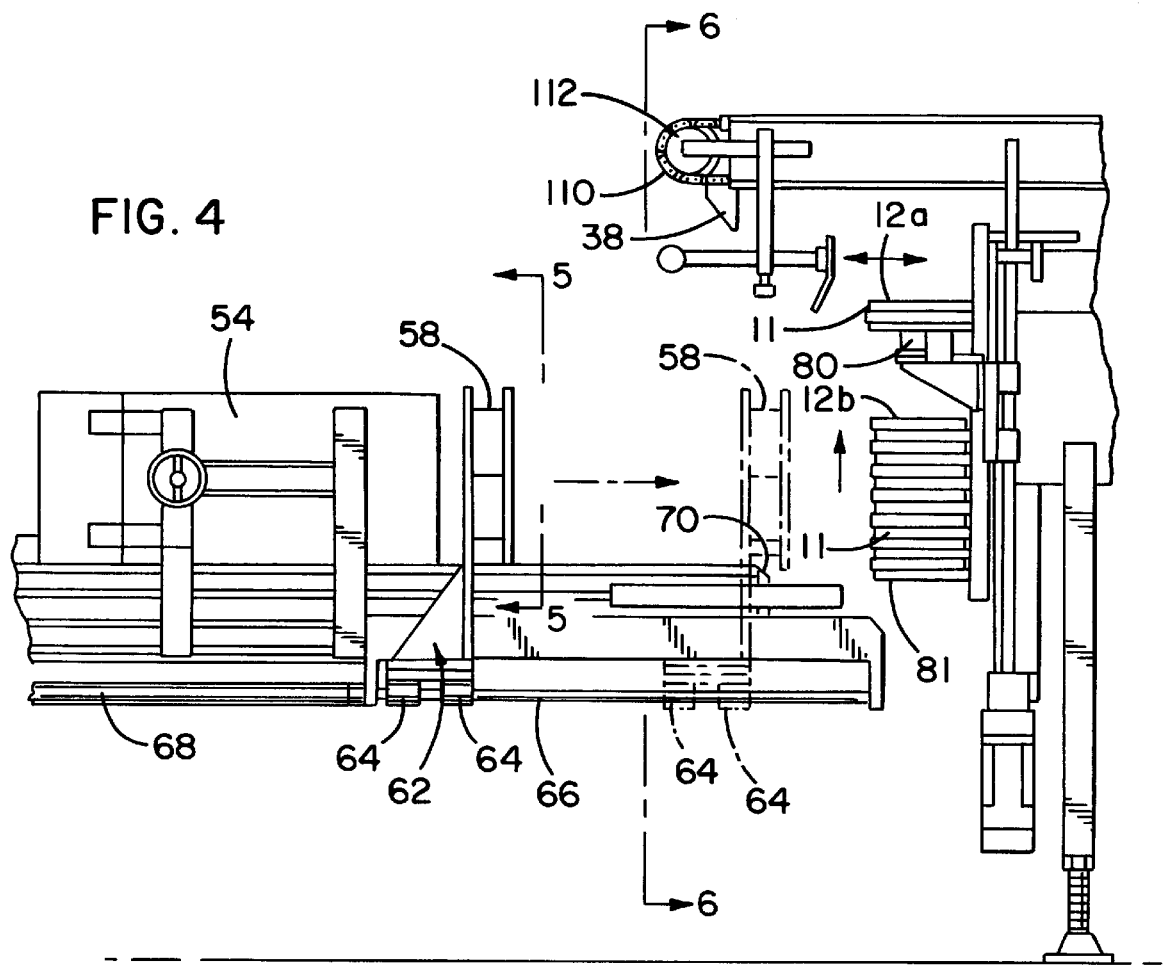
FIG. 4 is a fragmentary, elevational view showing the pusher elements for pushing books onto the elevators.

The preferred and illustrated stripper device 36, as best seen in FIGS. 2, 3 and 4, comprises an overhead conveyor endless chain 110 which extends around the forward pulley 112 and by another pulley 114 to travel in an endless path with a series of spaced pusher elements 38 affixed to the endless band chain 110, with each of the pusher elements being timed to push and engage a single book 11 to strip it from the top of the stack 12. The stripper element 38 pushes the top across a flat horizontal slide bed 115 (FIG. 2) to a location adjacent an upstanding frame post 116 where the book is pushed to the rotatable plate or platen 40 on the orienting conveyor 42. The latter has a pair of conveyor chains 120 and 121 which extend about and are driven by a motor 125 and gear box 126. The endless chains 120 and 121 travel between spaced sprockets 128 and 136 carried on a frame 137. The orienting plates 40 are pivotally mounted on upstanding pivot shafts 142, as best seen in FIGS. 2 and 10, to turn in bearings 138 which are carried by a transverse supporting bar 144 (FIG. 9) extending between the respective chains 120 and 121.

Figure 10:
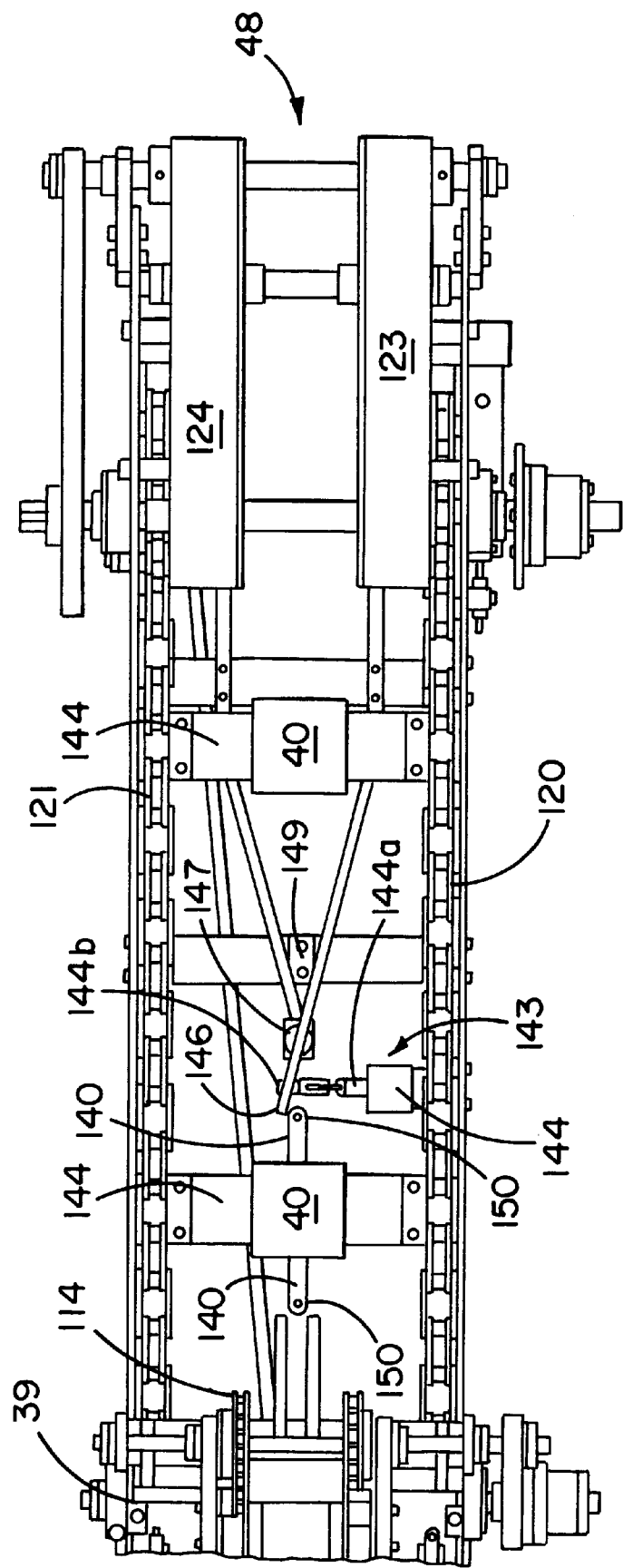
FIG. 10 is a fragmentary plan view of a diverter and solenoid to pivot an orienting plate.

As best seen in FIG. 10, each orienting plate 40 has a bar cam 140 affixed to the lower end of its pivot shaft 142 to be engaged and selectively pivoted by an actuator comprising, in this instance, a diverter assembly 143. The diverter assembly includes a solenoid 144 operated by the electric eye sensor 28 to cause the solenoid to retract or extend its shaft 144a. The solenoid shaft has a pivot connection 144b to an outer portion of a deflector element 146. The deflector element has a pivot mounting 147 mounted on a stationary cross frame member 149. Each of the bar cams 140 has a roller bearing 150 at its outer end to engage the outer end of the deflector element and to be pivoted by the pivoting deflector as the solenoid shaft 144a is extending or retracting. Four bar cams 140 are mounted at 90° from each other, as seen in FIG. 10, and the diverter causes each bar cam to pivot the plate 40 and book thereon through 90° when actuated by the solenoid 144. Thus, the deflector element 146 is selectively actuated and pushed against the rotatable pallet to turn it through 90° in one direction or the other direction so as to alternately turn alternate books so that all of the book backs 14 are facing in the same direction. Thus, the book backbones 14 are selectively positioned in the right direction by the diverter. Preferably, the electric eye 39 is located in close proximity to the book mounted on the pallet 40 as it travels beneath and discharges from below the stripping conveyor and then the diverter 146 is operated to turn the pallet 40 to properly position the books. At the discharge station 46, the preferred discharge device 48 comprises a pair of conveyor belts 123, 124 which convey the now properly oriented books as they leave the pallets 40 into a wrapping station or the like for a subsequent operation.

Referring now to FIG. 8, the drive for the oriented conveyor can be better seen and it comprises the motor 125 and output gear unit 126 which drives a belt 130 extending upwardly to a drive sheave 132 for a shaft 134 which carries the main drive sprocket for the conveyor chains 120 and 121. An opposite sprocket 136 is shown in FIG. 8 with chain 120 traveling there about in an endless path. Also, as best seen in FIG. 8, the conveyor belts 48 for discharging the oriented books are mounted for endless travel around sprockets 140. A suitable drive is connected for the sprockets 140 to the orient conveyor chain drive so that they travel in timed relationship and at the same speed that carried the discharging books from the turnable pallets or plates 40 on the conveyor chains 120.

A brief description of the above-described and illustrated apparatus will now be given. Stacks of books 12 are placed on the conveyor surface 50 by an operator who typically removes the stacks of books from a pallet (not shown) that was transported by a forklift truck and delivered to a position adjacent the conveyor 20. The conveyor 20 is called a stream or accumulating conveyor in that it usually will have a stream of book stacks 12 thereon. The book stacks are conveyed by the underlying, power driven rollers to adjacent the elevators. The selective operation of book clamps 52 clamps the leading book stack 12a and the book clamp 52b clamps the book stack 12b.

When the leading stack 12a is released by the operation of the clamping device 52 to its release position, the leading stack of books travels to the left as viewed in FIG. 3 will pass between the pair of retracted gates and pusher elements 58 with the underlying conveyor elements 50 pushing the released stack forwardly to abut the selectively raised stop 70 (FIG. 4) which abuts the lower book of the stack 12 and holds the same against further movement onto the lifting plate 80 or 81. During this operation, the second book stack is held by the clamping device 52b.

When the elevator plate 81 is in the position shown in FIG. 4, the closed pusher elements 58 travel forwardly along slide rails 66, and because the stop 70 is now retracted, the pusher elements are able to push the stack onto the elevator plate 81, as shown in FIG. 4. The pusher elements 58 will then return to the left in FIG. 4 for a subsequent gating and pushing sequence. The second book stack is released to travel to abut the pusher elements and to be clamped by the first clamping device 52.

The top book of the upper stack 12 is stripped and pushed at right angles by the stripper device 23 to travel horizontally. The illustrated stripper device 23 has depending pusher elements 38, each of which strips a top book and pushes it along a stationary bed plate 115 and then onto a rotatable orienting plate 40 of the orienting conveyor. The electric eye 39 senses the backbone 14 or the front 16 of the book leaving the stripping station 22 on the rotatable plate 40 and operates the solenoid 144 to pivot the diverter 146 against the bar cam to turn the pallet 40 through 90° in alternating operations to place all book backs facing rearwardly, in this instance.

The preferred sensing by the electric eye 39 is to sense the depth of the book side facing the electric eye. If the open side of the book is facing the electric eye, it measures a depth within a certain range. On the other hand, if the bookback is facing the electric eye, there is a lack of depth being sensed and the electric eye 39 actuates the solenoid 144 to rotate the book. If no book is present, the electric eye 39 senses no depth and actuates the solenoid to pivot the plates 40 each through 90°. Because the sensor senses each of the books, the operator may place stacks with the top book 11 in the stack either having an open end or a backbone for facing the electric eye 39. That is, the operator need not be concerned with the particular arrangement of counterstacking because the electric eye will sense the orientation of the stripped book irrespective of its prior position within a stack. The oriented books are carried by the plates 40 to the discharge conveyor 47 which carries them to a machine, such as a wrapping machine, for a subsequent operation.

It will be appreciated that although various aspects of the invention have been described with respect to specific embodiments, alternatives and modifications will be apparent from the present disclosure, which are within the spirit and scope of the present invention as set forth in the following claims.

What is claimed is:

1. An apparatus for feeding and destacking counterstacked books, orienting the books into the same direction, comprising:
    a feeder for feeding stacks of books to a destacking station;
    a stripper for stripping a book at one end of the stack at a destacking station and for feeding the books forwardly one at a time at spaced intervals;
    a sensing device for sensing the orientation of the books at a sensing station; and
    an orienting device at an orienting station operable by the sensing device to turn the books that are facing the wrong direction to have all of the books facing in the same direction.

2. An apparatus in accordance with claim 1, wherein the stripper comprises an overhead stripper for stripping books from the top of the stack.

3. An apparatus in accordance with claim 2, wherein the stripper comprises an overhead, continuously moving element with spaced pusher elements thereon to push the top book from the stack; and
    an elevator for raising the books to raise and present each of the stacked books into the path of a traveling pusher element which pushes the top book from the top of the stack.

4. An apparatus in accordance with claim 3, wherein a pair of elevators alternate in lifting stacks of books to position the upper books of their respective stacks for destacking.

5. An apparatus in accordance with claim 1, wherein the feeder comprises an accumulating conveyor having a plurality of book stacks thereon;

a pusher mechanism for selectively pushing a stack of books; and an elevator for raising a stack of books pushed thereon by the pusher mechanism at the destackable station.

6. An apparatus in accordance with claim 5, wherein the pusher comprises a gate portion and a pusher portion with the gate portion being movable to a release position to allow travel of a book stack therethrough and a closed position to push the book stack having passed therethrough onto the elevator.

7. An apparatus in accordance with claim 1, wherein the sensing device comprises an electric eye to sense the front of the book or a backbone on the book.

8. An apparatus in accordance with claim 1, wherein the orienting device comprises continuously traveling conveyor and a plurality of rotating plates on the conveyor which are selectively controlled by the sensing device to orient the book backbones all in the same direction.

9. An apparatus in accordance with claim 1, wherein the stripper comprising continuously traveling lifting plates to lift stacks of books and continuously traveling pushers to push the top books from the stacks; and the orienting device comprises:

a continuously traveling conveyor having rotatable plates selectively rotatable to rotate a book while it is being carried forwardly on a rotatable plate.

* * * * *